United States Patent
Sutton et al.

(10) Patent No.: US 8,413,239 B2
(45) Date of Patent: Apr. 2, 2013

(54) WEB SECURITY VIA RESPONSE INJECTION

(75) Inventors: Michael Andrew William Sutton, Reston, VA (US); Jeff Forristal, Elizabethton, TN (US)

(73) Assignee: Zscaler, Inc., San Jose, CA (US)

( * ) Notice: Subject to any disclaimer, the term of this patent is extended or adjusted under 35 U.S.C. 154(b) by 744 days.

(21) Appl. No.: 12/390,486

(22) Filed: Feb. 22, 2009

(65) Prior Publication Data
US 2010/0218253 A1    Aug. 26, 2010

(51) Int. Cl.
*H04L 29/06* (2006.01)
(52) U.S. Cl. .......................................... 726/23
(58) Field of Classification Search ...................... 726/23
See application file for complete search history.

(56) References Cited

U.S. PATENT DOCUMENTS

| 7,487,494 | B2 * | 2/2009 | Chan et al. ..................... 717/127 |
| 2006/0179484 | A1 * | 8/2006 | Scrimsher et al. ............... 726/23 |
| 2007/0107057 | A1 * | 5/2007 | Chander et al. ................. 726/22 |
| 2008/0313648 | A1 * | 12/2008 | Wang et al. ..................... 719/315 |
| 2009/0260087 | A1 * | 10/2009 | Ishida et al. .................... 726/25 |

* cited by examiner

*Primary Examiner* — Jason Gee
(74) *Attorney, Agent, or Firm* — Clements Bernard PLLC; Lawrence A. Baratta, Jr.; Christopher L. Bernard

(57) ABSTRACT

System and methods for injecting content into a response for improving client-side security. The system includes a content injection service external to network edges of at least one system. The content injection service receives a request from a client within the at least one system and identifies or anticipates a potential threat associated with the response. The content injection service is configured to determine an appropriate counter for the identified or anticipated potential threat and in response injects content into the response according to the potential or anticipated threat identified.

20 Claims, 4 Drawing Sheets

WEB SECURITY VIA RESPONSE INJECTION

BACKGROUND

This disclosure generally relates to improving client-side security and more specifically relates to identifying and eliminating potential threats associated with web responses.

Today, computers face ever-growing threats to security and privacy on the Internet. These threats not only originate from direct attacks, such as by viruses, but also from indirect attacks in the form of monitoring programs referred to as malware (malicious software). Spyware, for example, is a form of malware that serves to surreptitiously monitor and report computer user activities to third parties. The rapid proliferation of malware has significantly increased the number of client-side vulnerabilities, including vulnerabilities in web browsers, in office software, in media players, and in other desktop applications. Some other well-known web security vulnerabilities include cross-site scripting (XSS) and phishing websites. Security attacks increasingly lead to unauthorized activities on the Internet, such as identity theft, data corruption, and theft of company trade secrets, and thus require security measures to protect valuable information.

An enterprise, for example, can implement internal security measures at network edges by employing firewalls, gateway security agents, content filtering software, malware detection software, and similar known tools. Such security solutions, however, require the installation and management of hardware and software, either in-line or directly on enterprise machines. Typically, organizations have many, or even several thousand, computing systems. Also, the security software and hardware must be updated periodically. In general, to avoid large number of software installations and updates, a number of organizations presently employ a "software as a Service" (SAAS) model or 'in the cloud' implementations for managing enterprise data. A SAAS, or "in the cloud," model, also referred to as cloud computing, is a software deployment model that hosts applications or infrastructure as services for users across the Internet. For example, an application service provider (ASP) can provide data management through web services to an enterprise or individual user, eliminating the need for software installed on an individual user's computer.

Conventional threat detection services in a SAAS model operate to either allow or block a web page based on the content of the page. As web content becomes increasingly dynamic, such binary decision services are less effective. Moreover, some conventional security services provide security features by inspecting and processing a web response within the cloud. Such processing in the cloud may not be desirable for certain confidential applications, such as banking transactions. Further, a user or an enterprise may object to having sensitive transactions or documents processed off-premises.

Thus, there remains a need for a centralized security service that is dynamic, easy to handle, and effective, which results in improved security for users.

SUMMARY

The subject matter described in this specification is directed to improving client-side security, indentifying and mitigating potential threats related to a response of a request initiated by the client.

An embodiment of the claimed invention is a content injection service external to network edges of at least one system, for providing web security to the system. The content injection service is configured to receive a web request from a client within the system. The content injection service intercepts a response to the web request and identifies or preemptively anticipates a potential security threat associated with the response to the request. The content injection service is further configured to determine an appropriate counter for the identified potential threat and inject content into the response at a particular location within the response, based upon the counter determined.

Another embodiment of the claimed invention is a content injection service external to network edges of at least one system, for providing web security to the system. The content injection service is configured to receive a web request from a client within the system. The content injection service intercepts a response to the web request and injects content into the response at a particular location in the response, to eliminate potential threat associated with the response.

A further embodiment of the claimed invention is a method for providing web security to a client. The method includes receiving a web request from the client and identifying a potential threat associated with a response to the web request or preemptively anticipating a threat associated with the response. The method also includes determining an appropriate counter to eliminate the threat identified with the response. Based on the counter determined, the method finally includes injecting content corresponding to the counter and the content when executed, precludes the response from potential threats and thus provides security to the client.

BRIEF DESCRIPTION OF THE DRAWINGS

Like reference numbers and designations in the various drawings indicate like elements.

DETAILED DESCRIPTION

The following detailed description is made with reference to the figures. Preferred embodiments are described to illustrate the invention, not to limit its scope, which is defined by the claims. Those of ordinary skill in the art will recognize a number of equivalent variations on the description that follows.

Figure 1:
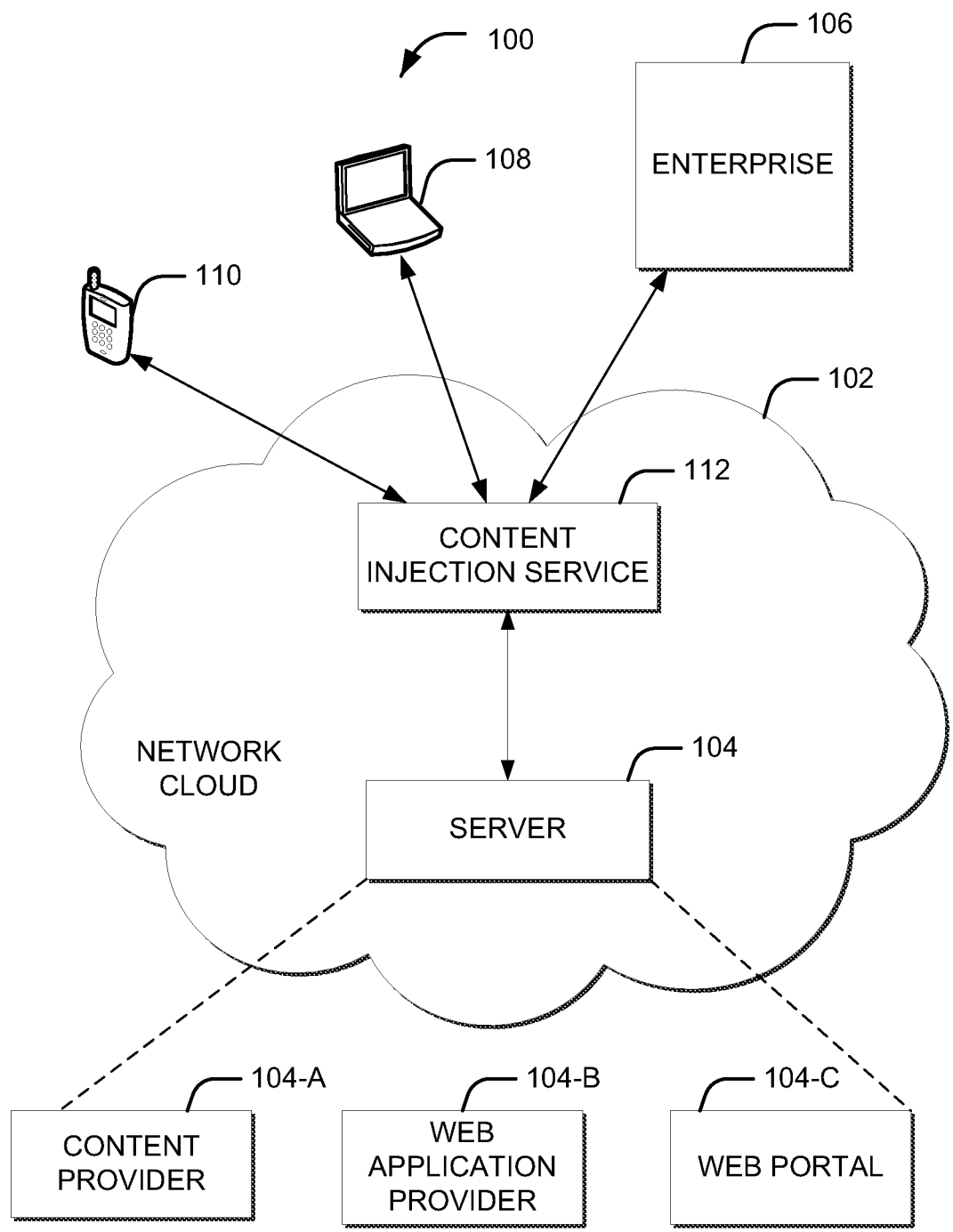
FIG. 1 is a block diagram of an environment of a communication network implementing client-side security.

FIG. 1 is a block diagram of an environment 100 implementing client-side security over a communication network, such as the Internet or the World Wide Web. The environment 100 includes a network "cloud" 102, which includes service providers or web servers, such as a server 104 that provides computer-based services to users across the Internet. The web service model eliminates the need to install and run the application on user's own computer to perform that function. The server 104 may be operated by a software vendor that hosts an application on its own server or a third-party application provider, which handles the services of the software vendor on their behalf. The server 104 may include a content provider 104-A, a web application provider 104-B, a web portal 104-C or other application providers known in the art. In some embodiments, these service providers may take form of an "in the cloud" model or "Software as a Service" (SAAS) model. It should be understood that a single server 104 is shown, for purposes of simplicity, but that server represents the millions of web servers accessible via the Internet.

A user may be operating on a system external to the network cloud 102, such as an enterprise 106, a computer device 108, a mobile device 110, or other network and computing systems known in the art. The network cloud 102 also includes a content injection service 112, which detects and precludes potential security and performance threats, for example, malicious software, related to a request initiated by a user.

The term "potential threat" discussed throughout the present disclosure includes any undesirable content that can pose a security risk or negatively impact the performance of a computing device. Potential threats may include, for example, viruses, spyware, spam or other threats known in the art.

The term "external system" refers to a system external to the network edges of the network cloud 102. The external system may include the enterprise 106, the computer device 108, the mobile device 110, or other systems known in the art.

The term "response" used throughout the description of the invention refers to a response generated by a web server such as server 104, responding to a request initiated by a client, such as a user of a computer 108. For example, a user may request a web server, such as the server 104, for a web page, and in turn, the server 104 responds to the request by sending Hypertext Markup Language (HTML) code corresponding to the web page. The response may include an email, a file, a web page, or some other data or data communication, including messages sent in the course of providing a web service, which may be represented in Simple Object Access Protocol (SOAP) or a similar protocol.

The term "user" or "client" is interchangeably used throughout the description of the claimed invention and may operate within the enterprise 106, the computer device 108 or the mobile device 110. Users may communicate with each other or with service providers over a communication network, such as the Internet, or some other combination of wired or wireless network. A user in the environment 100 requests one or more servers in the network cloud 102 and receives appropriate response to the request.

In general, a third party or an attacker may insert malicious content into a response. An attacker could accomplish that result by directly controlling the server providing the response, or by injecting malicious content into a third party server. Web servers, such as the web portal 104-C may execute a vulnerable application, which can be easily infected by an attacker and thus victimize users visiting the web portal 104-C, for example. Attackers may inject malicious JavaScript, VBScript, ActiveX, HTML, or Flash files into a vulnerable web application to victimize an external system and potentially obtain information from the user. This information can result in account hijacking, changing of user settings, cookie theft/poisoning, and other security threats known in the art. In particular, an attacker may hide malicious content using a variety of methods, such as basic encoding algorithms (e.g., Base64, ROT13, etc.) or specific obfuscation libraries/APIs so that the content is not human-readable when viewing the response, thus avoiding detection.

To detect and counter such attacks, the claimed invention employs a content injection service 112. The environment 100 requires all data destined for or received by a user to traverse an "in the cloud" infrastructure, the content injection service 112. This infrastructure may be installed in a centralized configuration or distributed across a number of physical locations. Some or all data requirements of each of the user within the external systems, including the enterprise 106, the computing device 108, and the mobile device 110 can be processed by servers in the network cloud 102, such as the server 104, employing the content injection service 112. In some embodiments, the server 104 is an application service provider, which provides access to a particular application program (such as customer relationship management) using a standard protocol, such as Hypertext Transfer Protocol (HTTP).

The content injection service 112 is shown as a single unit, and in the depicted embodiment it takes that form. Alternatively, other implementations could include multiple-component devices performing the functions described below, including Internet gateways, proxies and a plurality of server computers within a network, or different networks distributed over a geographic region. Employing the content injection service 112, the environment 100 can provide protection to external systems at locations throughout the geographic region. The content injection service 112 may act as a proxy that intercepts and injects content within responses to user requests addressed to remote sites. Alternatively, the content injection service 112 may simply pass users' requests to the designated web servers if inspection/injection is not required for specific requests.

The content injection service 112 can detect and mitigate potential threats by analyzing responses to requests initiated by an external system. Broadly speaking, the content injection service 112 identifies a potential threat to the external system and injects content into the response, based on the identified threat. Alternately, content may be injected into a response simply in anticipation of a threat, should it be encountered, without first identifying a specific threat. Details of the content injection service are set out below.

The content injection service 112 can reside in any convenient location. If desired, the content injection service 112 could be installed on a single external system, such as computer 108. Other systems could position it at the edges of the network cloud 102. The environment depicted in FIG. 1 positions that service within the network cloud 102, providing protective services to a number of subscriber or member systems. An Internet service provider, for example, or the gateway server could employ that topology for a corporate network. In other systems, the content injection service 112 provides security based upon detection or anticipation of any type and form of event or content. For example, the content injection service 112 may start identifying threats upon detection of a request for a web page or receipt of an HTTP response. In another example, the content injection service 112 may inject content that parses the response and looks for certain words or phrase associated with a threat. In that situation, the content may be injected without any analysis or identification, in anticipation of a potent threat.

Figure 2:
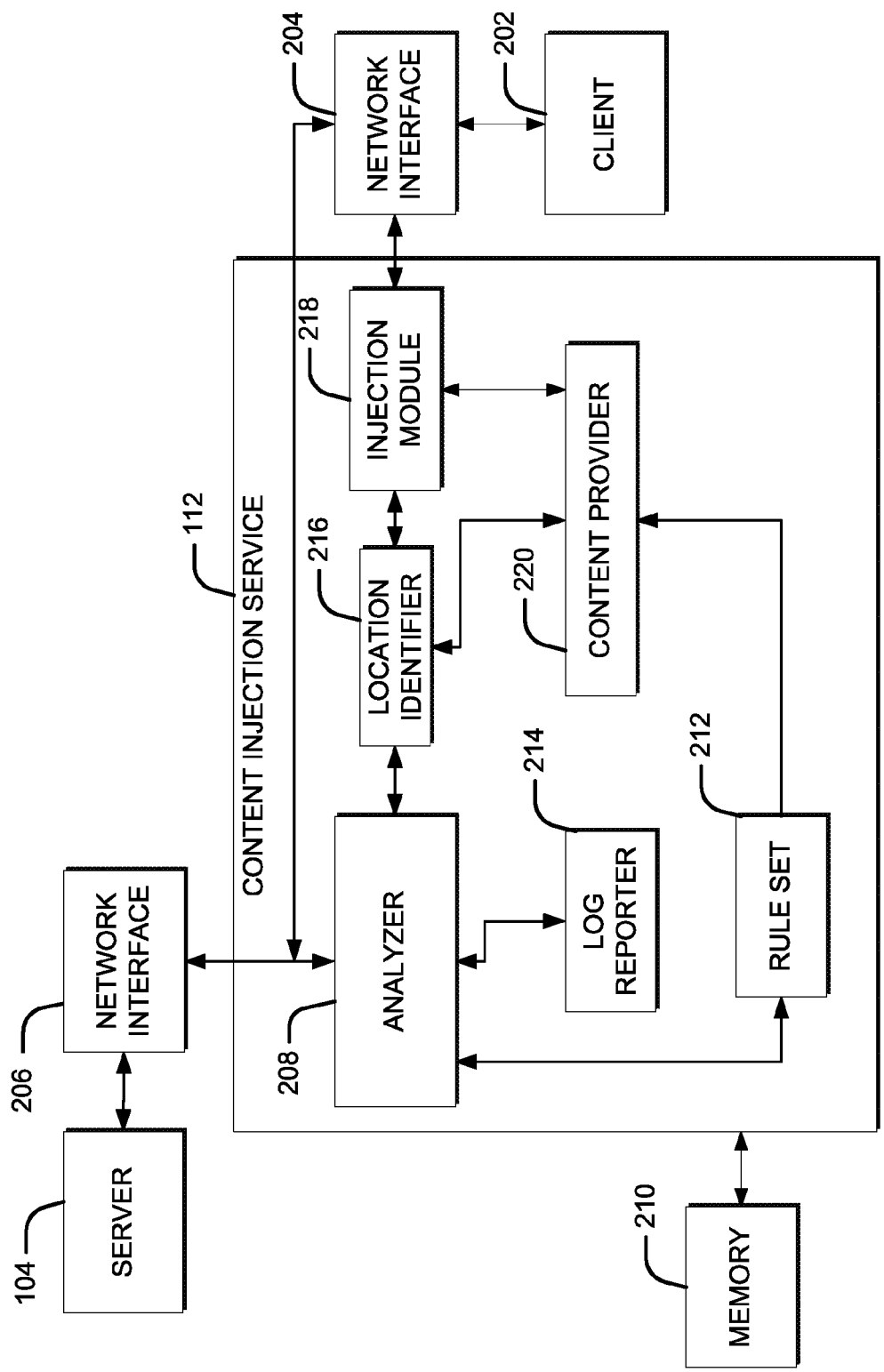
FIG. 2 is a block diagram of a system depicting elements of the environment shown in FIG. 1 in more detail.

FIG. 2 depicts the content injection service 112 and associated components, including the server 104 and a client 202. The client can be located at the enterprise 106, the computer device 108, or the mobile device 110, as shown in FIG. 1.

The arrangement of FIG. 2 does not require software installed on a computing device to ensure security, but rather sends all data requests to web servers in the network cloud 102. Such data requests reach the content injection service 112 through a network interface 204, which receives all requests initiated by the client 202 and transmits responses destined for the client 202, with or without modification. On the network side of the content injection service 112, the server 104 communicates outside the cloud (see FIG. 1) as well as with the content injection service 112, employing a network interface 206.

Typically, the client 202 requests for data or information from the server 104, and in turn, the server 104 responds to the request. All these requests and responses traverse the content injection service 112. In general, a response destined for a client can be classified as clean or infected. An infected response may include one or more of threats, such as spyware, malware, undesirable content, unknown content, and other threats known in the art. An important capability of the content injection service 112 is to identify and classify a response to a client's request as clean or infected.

The content injection service 112 performs three basic operations to provide security to the client 202: analyzing a response, identifying an injection point and injecting content at the identified injection point. Each of these operations is described in detail in the following sections.

It should be noted that in certain situations, the content injection service 112 may bypass the analyzing step. Where it is determined that preventive action will be helpful, the system can inject content in anticipation of a threat. In such cases, the content injection service 112 performs such injection service without any specific threat identification. For example, the content injection service 112 can inject a particular JavaScript function simply to ensure that the system overrides a malicious call, if it is ever encountered.

The content injection service 112 includes an analyzer 208 configured to perform a threat detection process to classify a response as clean or infected. The analyzer 208 can parse the response to identify and counter potential threats. For example, the analyzer 208 may identify a particular unwanted JavaScript function and inject an overriding function, ensuring that the undesired function is never called. In general, the analyzer 208 may analyze one or more parameters related to the request, the client 202, the server 104, the response, or the network. In order to analyze the response, network packets could be parsed individually or captured and re-assembled in order to obtain the full content of the page or file that is being examined. The content would be compared against data sets of known good/bad strings or combinations of strings in order to identify potentially malicious content. The data set used for comparison or identification of malicious content is discussed in the following sections. When unwanted or malicious functions are identified, an equivalent function can be injected at an appropriate location within the file, to ensure that the malicious function is overridden, should it be called. The appropriate injection location would be dependent upon the type of function that is to be overridden.

The analyzer 208 can utilize a variety of sources for identifying threats associated with the response, including a list of known malicious sites, functions, content, exploits, and the like. Sources may include known exploits identified from previous traffic, characteristics suggesting that the site is being used in a phishing attack (e.g., images and narrative matching commonly targeted sites, which are hosted at an alternate location) and other related data, stored in a memory 210. The analyzer 208 may classify a response as infected based on anticipation of malicious content included within the response. Also, the client 202 can employ a rule set 212 to define policies supporting the classification of a response.

In an embodiment of the claimed invention, the client 202 can configure the rule set 212 with security policies and rules, which declare and define well-known potential threats as well as threats specific to the client 202 or the associated external system. The rules may provide data for classifying threats and for measures to counter the same. Such countermeasures may include blocking specific functionality (i.e., changing a browser's home page or search provider), blocking malicious content (e.g., potential phishing sites or known attack vectors), injecting warning messages for end users, identifying malicious page formatting (i.e. Click jacking), performing a set of checks on the response, predefining a set of expressions that correspond to a threat, or adding default content into the response for providing security to the client 202. The rule set 212 may be tailored to the server 104, or to characteristics of the response, or to the requesting party or specific security requirements of the client 202. The content injection service 112 may also configure the rule set 212 with security rules depending upon the characteristics of the response, the server 104 serving the response, attributes of the client 202, or the network characteristics. Further, content or script corresponding to the rule set 212 may also be stored in the memory 210 for quick injection.

The content injection service 112 includes a log reporter 214, which stores threat-related data that can be employed by the analyzer 208 in response classification. The log reporter 214 may include a list of known viruses, a list of known malware websites, spam e-mail domains, unwanted functionality and other threat-related data. In addition, the analyzer 208 can update threat-related data within the log reporter 214 with pertinent results found during analysis of a response. Threat-related data may include domain names, fully qualified domain names, IP addresses, Uniform Resource Locators (URLs), or any other format, which uniquely identifies a web-based resource. For example, the analyzer 208 may store the URL of an identified phishing site. Threat-related data lists may also consist of string-based search patterns that correspond to potential security threats.

Depending on the known potential threats, the rule set 212, and the threat-related data stored in the log reporter 214, the analyzer 208 classifies the response as clean or threat detected. In general, the analyzer 208 analyzes a response to ensure authenticity and if the response is found to be clean, it may be transmitted as such to the client 202. If the response, however, includes malicious content or anticipated to include malicious content, the content injection service 112 determines an appropriate countermeasure to deal with the identified malicious content and provides security to the client 202. The analyzer 208 determines a countermeasure depending on the threat classification of the response and on the rule set 212. The countermeasure identified by the analyzer 208 may facilitate adding security content into the response, deleting some content from the response, modifying elements of the response, overriding functions within the response, or alerting the client 202 to a potential threat.

Next important operation performed by the content injection service 112, as discussed above, is to identify an appropriate location or injection point within the response for injecting content, using a location identifier 216. The countermeasure identified for each potential security threat facilitates the desired security feature only when the content corresponding to the counter is inserted at an appropriate location within the response. In addition, the injection point depends on the counter employed. The injection point for content designed to override a malicious function needs to be at the beginning of the response. The injection point for content designed to search and identify malicious data, however, is towards the end of the response, so that it triggers the searching and identification process once all the response data is available for inspection. Once the location identifier 216 identifies an appropriate injection point within the response, next content needs to be selected or generated for insertion. For example, overriding a malicious JavaScript function requires additional JavaScript to be injected at the first occurrence of the HTML <head> tag, the HTML <body> tag, or the HTML <script> tag. JavaScript content designed to search and identify malicious data would be injected at the first occurrence of the HTML </body> tag, HTML </html> tag, or the end of the document.

An injection module 218 facilitates another basic functionality of the content injection service 112, to inject content into the response to eliminate identified threats. Based on the countermeasure identified by the analyzer 208 or based on anticipation of a potential threat, the injection module 218 determines content to be injected into the response. The injection module 218 employs a content provider 220 for generating or selecting appropriate content to be injected into the response, based on the anticipated or identified threat. The content provider 220 may select content from a pre-defined or pre-coded set of content stored in the memory 210, corresponding to the rule set 212.

The content provider 220 may also dynamically generate content to be injected into the response based on the security polices in the rule set 212 or characteristics of the response. For example, a user-defined rule may permit certain types of injection but not others. If two users have separate security policies, say, the response content may be the same for both users, but different actions could be taken based on those responses. In that situation, the injected content could be generated at the time the response is analyzed, rather than being predefined. Further, the content provider 220 may dynamically generate content based on the characteristics of the response and also inject pre-coded JavaScript from the memory 210 based on the rule set 212.

The content injected by the injection module 218 may also be based on the rules and policies described in the rule set 212. In certain situations, the rule set 212 may be configured to inject a variety of content into every response for a request made by the client 202. This content, injected without analysis by the analyzer 208, may be stored in the memory 210. For example, it may be anticipated that an attacker may try to change a user's default browser homepage. To prevent such an attack the rule set 212 may call for injecting a default function into every response, such as setHomePage( ), which overrides any malicious function trying to modify a user's default home page. Some responses may not include such malicious functions; however, this injected function eliminates any such threat. In other situations, however, the analyzer 208 may be required to analyze the response; based on the identification of certain phrases or words within the response, the injection module 218 injects appropriate content stored in the memory 210. For example, the rule set 212 may require the analyzer 208 to look for a particular string within the response, such as "AddSearchProvider( )", where the string corresponds to a function trying to modify a user's default search engine. Upon identification of that string, the injection module 218 injects a JavaScript configured to override this AddSearchProvider( ) identified with a proprietary AddSearchProvider( ) function. Other threats can be addressed by other security rules, of course.

The content injected into the response can be active content (such as JavaScript, VBScript, and the like), also referred to as client-side script, which may be executed to facilitate addition, modification, or deletion of content or report a potential threat to the client 202. Alternatively, the injected content may be a HTML script configured to display a warning message to the client 202. It will be appreciated by those skilled in the art that the content may be coded in other scripting languages known in the art as well. The content may also be encoded or encrypted to avoid further attacks or leakage.

Once the analyzer 208 recognizes or suspects a potential threat within a response, content may be injected to simply notify the client 202. The injected content can include alerting capabilities such as dynamically displaying a warning message to the client 202. Further, the content may also have capabilities of blocking any further processing of the request upon detection of malicious content and log details regarding the event in the log reporter 214.

In an exemplary implementation, the content injected into the response may override malicious functions. For example, an attacker may try to convince a user to click on a link within a response, thus triggering malware that changes the user's home page or default search engine, in order to facilitate "click-fraud". In such a situation, the content provider 220 generates a JavaScript that overrides any function within the response that tries to modify user's home page or default search engine and ensures that the user's current settings are always retained. In this example, in order to retain the current web browser search engine the AddSearchProvider( ) could be overridden to ensure that a third party website cannot facilitate the change of the browser search engine. In this case, the content injection service injects this function at the beginning of a response so that it overrides any AddSearchProvider( ) function used by an attacker in the response. This alternate function ensures that it blocks any AddSearchProvider( ) from changing the default search engine. Further, this function may be injected by default into every response. The injected content could also display a warning message to the user on identification of an AddSearchProvider( ) function within the response.

Figure 3:
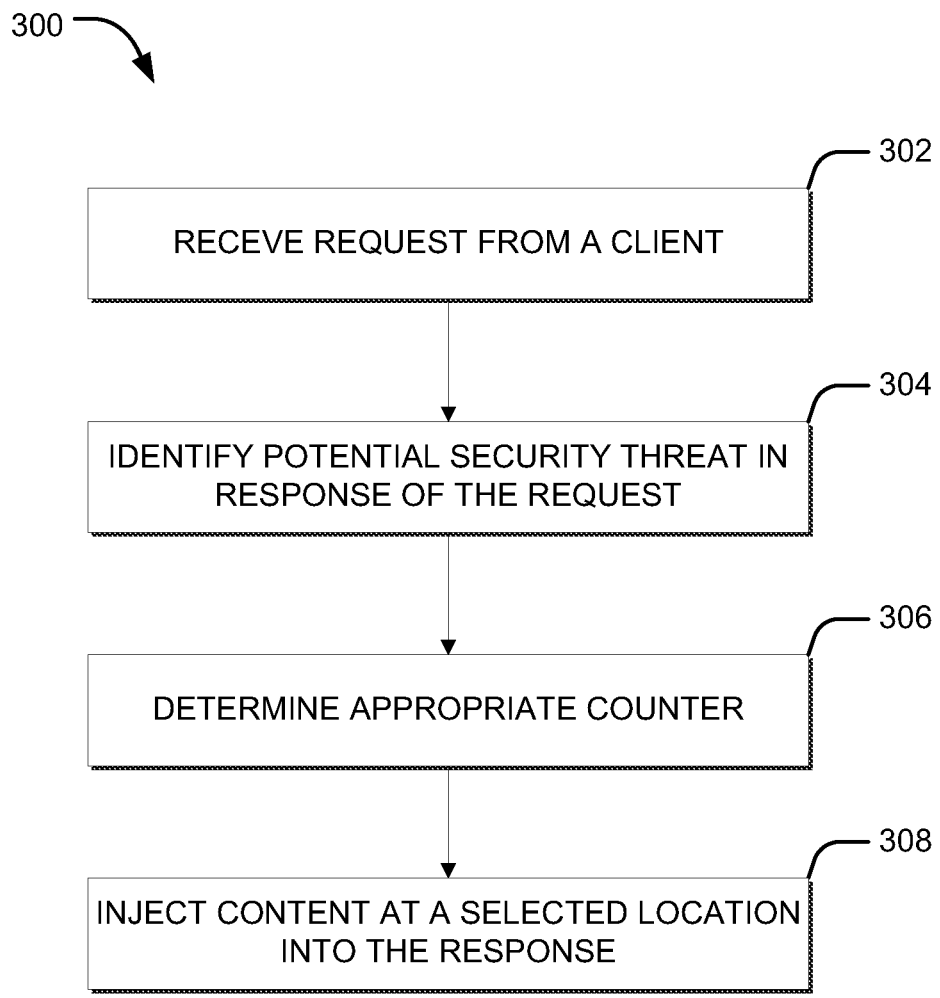
FIG. 3 is a flowchart of an embodiment of a method for improving client-side security employing a content injection service.

FIG. 3 charts an embodiment of a method 300 for improving client-side security employing the content injection service 112, as discussed in connection with FIGS. 1 and 2. The method 300 is applicable in the environment 100 as shown in FIG. 1; however, those skilled in the art will appreciate that the method 300 may be applicable on other communications networks known in the art. The steps shown in FIG. 3 are each processes that can be executed independently and concurrently as appropriate.

This process begins at step 302, where the content injection service 112 (see FIGS. 1 and 2) receives a web request from the client 202. As known in the art, such a web request could be, for example, a request for a web page, or a search query, or a message in a web service choreography. The web request is passed on via the Internet, and a response is received. The response is processed at the content injection service 112, which, at step 304, identifies a potential threat within the response, employing the analyzer 208 as set out above in connection with FIG. 2. As noted there, situations exist in which the identification step does not focus on a specific threat but rather identifies a general pattern that triggers a decision to anticipate a threat by preemptively deploying a countermeasure. Further, the analyzer 208 determines an appropriate countermeasure to the potential threat identified at step 306. The counter will include specific content, as set out above, selected using the content provider 220. The injection module 218 then injects the selected content into the response at a selected location. The content corresponding to the counter identified may be selected from a set of already available content in the memory 210 or it could be dynamically generated by the content provider 220. It should be noted that the content injection service 112 also identifies an appropriate location within the response to inject the content using the location identifier 216, since the counter identified may be location specific and will facilitate the required threat elimination only when inserted at the specific location within the response.

In another embodiment of the claimed invention, the content injection service 112 receives a web request from the client 202 and injects content within a response to the web request, to eliminate a potential threat associated with the response. The content injection service 112 injects content, without any threat identification, as a preventive measure in anticipation of a threat.

Thus, the method 300 facilitates client-side security by intercepting a response to a request and injecting appropriate content into the response based on the identification or anticipation of a potential threat associated with the response.

Figure 4:
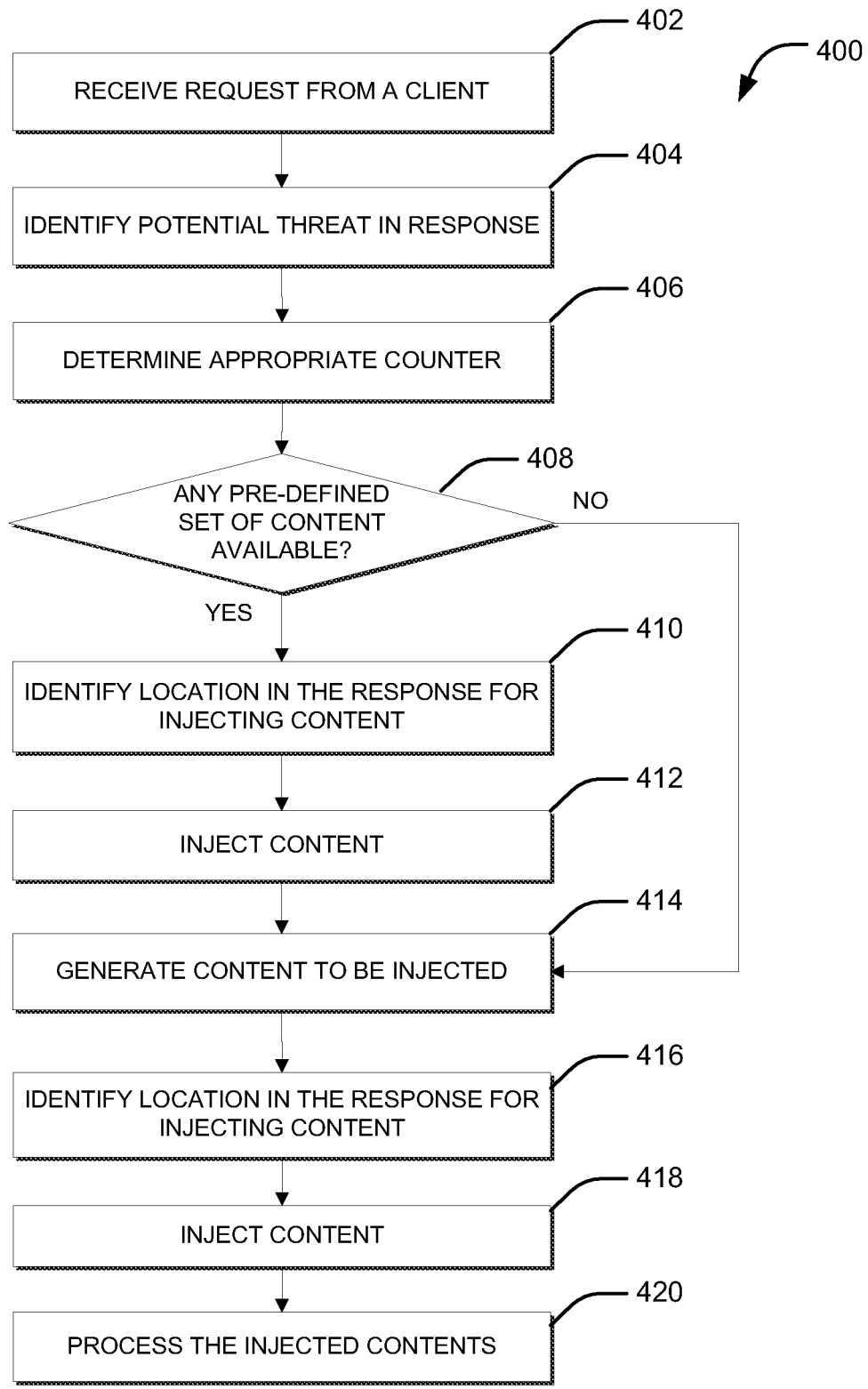
FIG. 4 is a flowchart of an alternate embodiment of a method for implementing client-side security, performed as shown in FIG. 3.

FIG. 4 offset out an alternate embodiment of the method 300 for implementing client-side security, performed as shown in FIG. 3. FIG. 4 describes a method 400 employing a content injection service to inject content into a request response that mitigates a potential security threat on execution.

Here, the content injection service receives a request for a client at step 402, just as discussed above. The content injection service acts as a centralized infrastructure for all client requests and responses. The request may be directed to the content injection service itself, or, in other embodiments, the request may be addressed to a web server.

At step 404, the content injection service identifies a potential threat, if any, associated with a response to the request. To identify a threat, the content injection service analyzes the content of the response and may utilize security rules specific to the client or network, threats known in the art, or previously encountered threats to classify the response as clean or malicious.

At step 406, the content injection service determines an appropriate countermeasure to tackle the identified threat. The countermeasure determined is dependent on the characteristics of the malicious element embedded in the response. The countermeasure may also anticipate a potential threat within the response. For example, the content injection service may determine a counter to alert the client regarding presence of a potential threat in the response. In another example, the content injection service may determine a counter to inject a default setHomePage( ) function, discussed above, and search for particular strings or phrases within the response, where the strings and phrases corresponds to a threat. Other counters may facilitate adding, overriding, deleting or modifying content within the response to provide security to the client.

Further, the content injection service identifies any predefined set of content available for injection at step 408. As discussed in connection with FIG. 2, the client or the content injection service may define a set of security checks or rules, such as the rule set 212. In some implementations, these security rules may require default insertion of content into every response or content specific for some application, web server, or client, as described in connection with the rule set 212. In other implementations, the security rules may require analysis or identification of a particular threat-related parameter before insertion of content, and this analysis may be specific to client, network, server, or application. Thus, based on the rule set 212, the content injection service selects content from the set of available content. At step 410, the content injection service determines an appropriate injection point within the response and consequently, injects the content into the response at step 412.

If the content injection service does not identify any predefined content for injection, however, then at step 414 the content injection service generates content to be injected into the response based on the counter determined at the step 406. The content injection service dynamically generates content based on the rule set 212 or the characteristics of the response. The injected content may facilitate addition, deletion or modification of the response to provide security to the client. In some implementations, upon detection of malicious content or potential malicious content in a response the content injection service notifies and alerts the client. In others, the content injection service may facilitate addition, deletion, modification, or notification, either singly or grouped. The content generated may be in the form of JavaScript, HTML script or suitable script interpreted by the client.

At step 416, the content injection service identifies an appropriate location within the response for injecting the generated content. As discussed above, the functionality of the content may differ with the injection point and thus, the content injection service identifies the appropriate location for injection. Subsequently, at step 418 the content injection service injects the content into the response at the selected location.

Finally, at step 420 the client receives the response with injected content and processes the content to preclude a possible threat. The client generally includes a web browser that processes the injected content, though any element capable of interpreting the content within the response will suffice. Pushing processing of content to clients decreases the time required at the content injection service and in turn decreases latency, the amount of time elapsed between a client sends a web request and starts receiving response for the request. Additionally, client-side content processing may be desirable for a number of applications, such as banking transactions. If desired, the content injection service can process the injected content on behalf of the client.

The content injection service discussed in connection with FIG. 1 through FIG. 4 provides security features to users against potential threats. Given below are two exemplary embodiments aimed at well-known security threats setting out the functionality of the content injection service in each scenario.

The first example posits a cross-site scripting (XSS) attack, activated upon clicking on a link within a document, such as an email message or web page. That event causes the user's browser to send a script, such as a malicious JavaScript, to a vulnerable server; the JavaScript is then echoed back and executed on the user's browser. This malicious JavaScript can be a threat to the user when it executes, as it then alters the content of the page received and can result in stolen authentication credentials, data leakage, overwritten page contents, etc. XSS could be identified, for example, by looking for the presence of JavaScript within predefined parameters to be included within a subsequent request. In this scenario, the content injection service may inject a script into the document that searches a response for active content embedded in the parameters of requests triggered by links being clicked on, in order to identify XSS attacks. Upon identification of a XSS attack, the content injection service may delete the malicious JavaScript and further notify the user.

In another example, an attack centers on a phishing site, a web page that mimics the login pages of a popular site such as a bank, in order to gather confidential user information, such as credentials, bank account numbers or the like. The attacker may send the user an email, for example, directing the user to update her account information. The email provides a link to accomplish that action. The email looks real, and the email address looks genuine, but the link actually directs the user to the phishing site. There, the user is asked for confidential information, such as an SSN and bank account code, which is collected by the phisher. To counter such a threat, the content injection service injects content, such as a JavaScript, at the end of the web page to inspect the web page and identify indications that the user is at a potential phishing site or an authorized bank site. The JavaScript, for example, searches for specific strings or content linked from legitimate sites within the web page and on detection of a match, the web page is flagged as a potential phishing site and its URL may be logged for future reference. Further, the user may be notified about the potential phishing site by displaying a warning message.

The execution of the injected content facilitates the required functionality of eliminating threats associated with a web response or alerting the client regarding presence of a potential threat within the response. Thus, the content injection services can provide improved security features to any client or user against any malicious content or potential security threat.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, for example, a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices.

Embodiments of the subject matter described in this specification can be implemented in a computing system that includes a back end component, for example, as a data server, or that includes a middleware component, for example, an application server, or that includes a front end component, for example, a client computer having a graphical user interface or a Web browser through which a user can interact with an implementation of the subject matter described is this specification, or any combination of one or more such back end, middleware, or front end components. The components of the system can be interconnected by any form or medium of digital data communication, for example, a communication network. Examples of communication networks include a local area network ("LAN") and a wide area network ("WAN"), for example, the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A system for improving web security, comprising:
a computer server comprising a content injection service in a cloud external to network edges of a system, the content injection service comprising instructions executable by the server, and in response to such execution causes the server to:
  receive a web request from a client within the system, wherein all data destined for or received by a user traverses the content injection service in the cloud,
  identify a potential threat comprising one of a malicious function and malicious data included in a response to the web request or preemptively anticipate such a threat,
  determine an appropriate counter of a plurality of countermeasures for the potential threat, wherein the countermeasures comprise blocking the malicious function, blocking malicious content, injecting warning messages, identifying malicious page formatting, performing a set of checks on the response, predefining a set of expressions that correspond to a threat, and adding default content into the response for providing security to the client, and
  inject content selected to embody the counter, at a selected location in the response, wherein if the counter is designed to override the malicious function, the selected location is at a beginning of the response, and if the counter is to search and identify the malicious data, the selected location is towards an end of the response after all response data is available for inspection.

2. The system of claim 1 further comprising a client browser executed on a computer, and the client browser is configured to process the content injected into the response.

3. The system of claim 1, wherein the appropriate counter includes at least one of:
  reporting the client regarding presence of the potential threat in the response;
  overriding the potential threat with a predefined function;
  deleting content of the response corresponding to the potential threat; or modifying the response to mitigate the potential threat.

4. The system of claim 1, wherein the content injection service is further configured to generate the content to be injected into the response based on a set of rules.

5. The system of claim 4, wherein the content injection service generates the content dynamically.

6. The system of claim 4, wherein the set of rules are defined by the client.

7. The system of claim 4, wherein the set of rules are defined by the content injection service.

8. The system of claim 1, wherein the content injection service is further configured to select the content to be injected from a predefined set of content available with the content injection service.

9. The system of claim 1, wherein the particular location is identified based on the determined counter.

10. The system of claim 1, wherein the content is a client-side script, including JavaScript configured to search and identify malicious data or Hyper Text Markup Language (HTML) configured to display a warning message based on the threat, wherein the selected location of the JavaScript is at a first occurrence of an HTML </body>tag, an HTML </html>tag, or an end of the response.

11. The system of claim 1, wherein the content further includes scripts performing one or more of:
  executing instructions defined in the content; or displaying information to the client.

12. The system of claim 1, wherein the content injection service further includes a memory module for logging details of the potential threat.

13. A method for improving web security, comprising:
  receiving a web request from a client within a system, wherein all data destined for or received by a user traverses the system in a cloud comprising a plurality of servers distributed across a number of physical locations;
  identifying a potential threat comprising one of a malicious function and a client-side script in a response to the web request or preemptively anticipating such a threat;
  determining an appropriate counter of a plurality of countermeasures for the potential threat, wherein the countermeasures comprise blocking the malicious function, blocking malicious content, injecting warning messages, identifying malicious page formatting, performing a set of checks on the response, predefining a set of expressions that correspond to a threat, and adding default content into the response for providing security to the client;
  injecting content selected to embody the counter at a selected location in the response, wherein if the counter is designed to override the malicious function, the selected location is at a beginning of the response, and wherein if the counter is the client-side script comprising JavaScript, the selected location is at a first occurrence of a Hyper Text Markup Language (HTML) </body>tag, an HTML </html>tag, or an end of the response.

14. The method of claim 13 further comprising processing the injected content on a browser within the client.

15. The method of claim 13, wherein determining the appropriate counter includes at least one of:
  reporting the client regarding presence of the potential threat in the response;
  overriding the potential threat with a predefined function;
  deleting content of the response corresponding to the potential threat; or modifying the response to mitigate the potential threat.

16. The method of claim 13, wherein the injecting step includes generating the content based on a set of rules.

17. The method of claim 13, wherein the injecting step includes selecting the content from a predefined set of content.

18. The method of claim 13, wherein the selected location is identified based on the determined counter.

19. The method of claim 13 further includes logging details of the potential threat.

20. A system for improving web security, comprising:
A plurality of computer servers comprising a content injection service in a cloud external to network edges of a system and distributed across a number of physical locations, the content injection service comprising instructions executable by each of the servers, and in response to such execution causes each of the servers to:
receive a web request from a client within the system, wherein all data destined for or received by the client traverses the content injection service in the cloud,
select a counter from a plurality of countermeasures for the web request based on one of a malicious function and a client-side script in the web request, wherein the countermeasures comprise blocking the malicious function, blocking malicious content, injecting warning messages, identifying malicious page formatting, performing a set of checks on the response, predefining a set of expressions that correspond to a threat, and adding default content into the response for providing security to the client; and
inject content at a selected location in a response to the web request, to mitigate potential security threat associated with the response, wherein if the counter is designed to override the malicious function, the selected location is at a beginning of the response, and wherein if the counter is the client-side script comprising JavaScript, the selected location is at a first occurrence of a Hyper Text Markup Language (HTML) </body>tag, an HTML </html>tag, or an end of the response.

* * * * *